2,987,012
CONVEYOR SYSTEMS
Donald Mayer King, Stevenage, England (% Argyle Works, Stevenage, Hertfordshire, England)
Filed Mar. 17, 1958, Ser. No. 722,104
3 Claims. (Cl. 104—172)

This invention relates to conveyor systems of the kind in which load carrying trolleys are propelled along a fixed overhead track by means of pusher dogs or abutments carried by an endless driving chain which is caused to travel along a path disposed vertically above the aforesaid track. In systems of the kind generally referred to it is common practice to interpose between the pusher dogs which are spaced along the chain, so-called retaining dogs or abutments which are effective to prevent undesired forward movement of the trolleys relatively to the chain when for example said trolleys are moving along inclined sections of the conveyor path.

It is the chief object of the invention in a system of the kind indicated to evolve means whereby any selected pusher dog or retainer abutment may be moved out of operative relationship with a trolley in any selected section of the conveyor path.

According to the present invention in a conveyor of the kind set forth the pusher and/or retainer dogs or abutments are so supported as to be capable of projective and retractive movements relatively to the chain into and from an operative position wherein they will engage the load carrying trolleys. Preferably means will be provided at one or more points along the conveyor path which means will be operative at will to cause a retractive movement of the dogs or abutments from their operative position.

Figure 1:
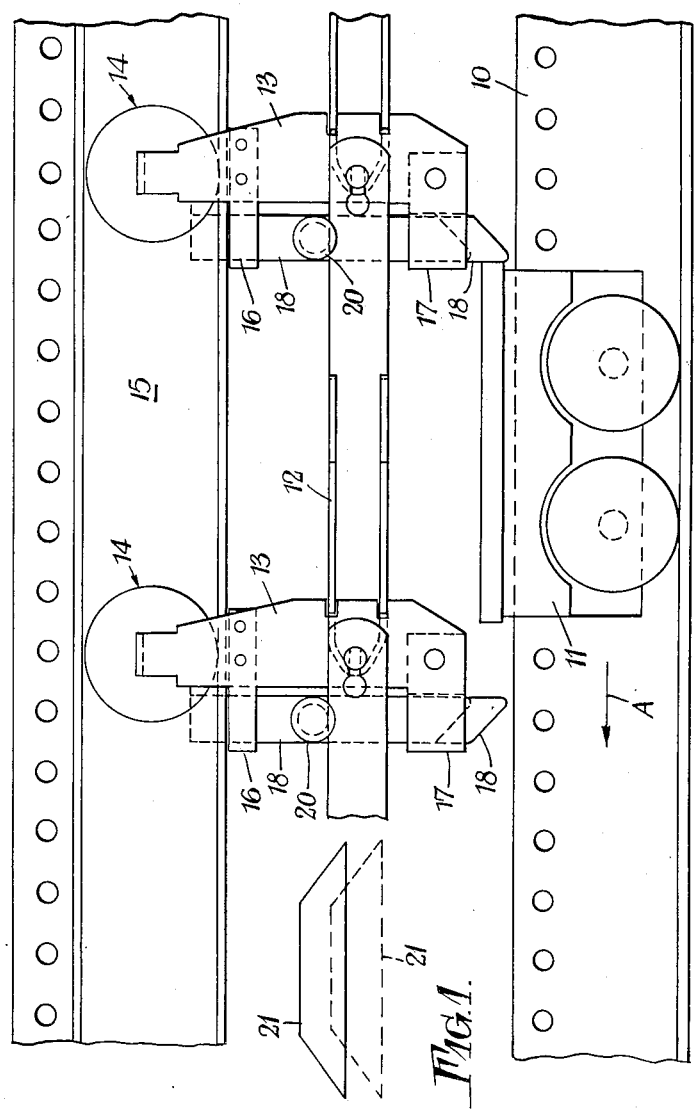
Figure 2:
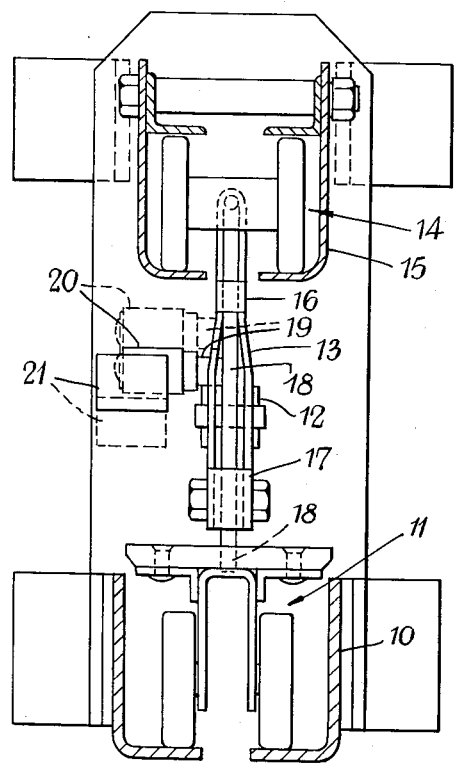

In order that the said invention may be clearly understood and readily carried into effect the same will be hereinafter more fully described with reference to the accompanying drawings in which:

FIGURE 1 is a side elevational view illustrating a small section of a conveyor, one of the upper and lower track members having been removed to permit of better illustration, FIGURE 2 is an end view looking from the left of FIGURE 1.

Referring to the drawings 10 denotes a main or trolley track which is formed by two angled section members appropriately disposed to form a track of channelled section. The track 10 serves to support a plurality of load carrying trolleys one of which is indicated at 11 each such trolley incorporating in known manner a depending load bar (not shown) which projects through the slot in the base of the track 10 and to which loads to be conveyed are attached.

Disposed vertically above the track 10 is an endless driven chain 12 which is supported at spaced points along its length by means of hangers 13 said hangers each depending from a separate trolley such as is indicated at 14. The trolleys 14 are supported on an upper track 15 which similarly to the track 10 is formed of two angle section members appropriately disposed in spaced parallel relation to provide a track of channel section. Attached to each hanger 13 are two generally U shaped brackets 16 and 17 which are spaced vertically one above the other and are adapted to constitute guides for an elongated strip like member 18 adapted to constitute a pusher dog or abutment the arrangement being such that the latter will be capable of a free vertical axial sliding movement. Rotatably mounted on a laterally projecting stud or pin 19 carried by each dog or abutment 18 is a roller 20. In the normal or operative position shown in full lines in the drawings the dogs or abutments 18 will assume a position wherein the lower end thereof will lie in the path of and will contact the upper part of any load trolley supported on the track 10. Said dogs or abutments will be supported in the operative position by virtue of the fact that the studs or pins 19 will rest on the upper surface of the chain 12.

Located at selected points along the conveyor path are ramp elements 21 which are so disposed as to cooperate with the rollers 20 on the dogs or abutments 18, such ramp elements each being adapted to be moved from an inoperative position shown in dotted lines wherein it is below the level of the rollers 20 to an operative position shown in full lines. The arrangement is such that when a ramp element 21 is in its raised or operative position it will lie in the path of the rollers 20 carried by the dogs or abutments 18 and will be effective, due to the fact that said dogs or abutments are moved relatively thereto by reason of the travel of the chain 12, to cause the dogs or abutments to be lifted vertically into the position indicated in dotted lines wherein the lower ends thereof will be lifted clear of any trolley present on the track 10 in the region of the ramp. The ramp element may obviously be operated electrically, pneumatically or mechanically and if desired a number of ramp elements spaced along a section of the conveyor path may be coupled together in such a way that when one is actuated to cause discontinuance of the drive to a selected trolley the next preceding ramp element along the conveyor path will be actuated automatically to effect discontinuance of the drive to the next following trolley.

It may be mentioned here that in the embodiment illustrated in FIGURE 1 with the conveyor travelling in the direction of the arrow A the right hand dog or abutment 18 will actually constitute a pusher or driving dog while the left hand dog or abutment will merely serve as a retainer abutment or stop to prevent undesired forward travel of the trolley 10 relatively to the chain 12 for example when said trolley is traveling down an inclined section of the track 10.

Clearly instead of the construction above described it may be desirable to provide each dog or abutment with two rollers such as 20 such rollers being disposed in axial alignment and at opposite sides of the dog or abutment. In such a case of course the ramp elements would also be disposed in pairs one at each side of the path of travel of the chain to cooperate with the aforesaid rollers.

I claim:

1. A conveyor device comprising an upper track, a further track beneath said upper track, a load carrier freely movable along said further track, a driven chain, at least one hanger displaceable along said upper track, said hanger depending from said upper track and suspending said chain therefrom, a dog supported on said hanger for free vertical displacement, said dog normally being displaced downwardly under the influence of gravity for engaging and driving said load carrier, and means for engaging said dog and displacing the same upwardly to free said load carrier.

2. A device as claimed in claim 1, comprising a roller extending laterally of said dog, said means including a ramp for engaging said roller.

3. A device as claimed in claim 1, wherein said dog is an elongated member, said hanger including means supporting the elongated member for axial displacement.

References Cited in the file of this patent
UNITED STATES PATENTS

| | | |
|---|---|---|
| 1,000,106 | Morris | Aug. 8, 1911 |
| 2,612,847 | Burrows | Oct. 7, 1952 |
| 2,619,916 | Rainier | Dec. 2, 1952 |
| 2,684,039 | King | July 20, 1954 |
| 2,751,852 | Joy | June 26, 1956 |
| 2,844,105 | King | July 22, 1958 |

FOREIGN PATENTS

| | | |
|---|---|---|
| 766,453 | Great Britain | Jan. 23, 1957 |